BROAD BAND TEM DIODE LIMITERS

Filed May 6, 1963

INVENTORS
ROBERT V. GARVER
& JOHN A. ROSADO
BY Harry M. Saragovitz, Edward J. Kelly, Herbert Berl & J. D. Edgerton
ATTORNEYS.

United States Patent Office 3,226,661

Patented Dec. 28, 1965

3,226,661

BROAD BAND TEM DIODE LIMITERS

Robert V. Garver, Rockville, Md., and John A. Rosado, McLean, Va., assignors to the United States of America as represented by the Secretary of the Army Filed May 6, 1963, Ser. No. 278,810
7 Claims. (Cl. 333—81)
(Granted under Title 35, U.S. Code (1952), sec. 266)

The invention described herein may be manufactured and used by or for the Government of the United States of America for governmental purposes without the payment to us of any royalty thereon.

This invention relates to the field of power limiters and more particularly to the field of transmission line power limiters.

Many microwave devices require means for limiting the power applied to particular circuits. This limiting may be necessary to protect delicate components from burnout or to remove random amplitude fluctuations from an information signal. As with all electronic devices, it is desired that such limiters be operative over as wide a bandwidth as possible. The larger the frequency range of any particular element the greater is its utility and the flexibility of devices in which it is used.

It is therefore an object of this invention to limit the power of a microwave signal over a wide range of input powers and signal frequencies.

It is another object of this invention to provide such limiting in a simple and inexpensive device.

Still another object of this invention is to provide limiting of signals which vary in frequency from the ultra-high frequency region down to zero frequency.

Yet another object of this invention is to provide power limiting in any type of transmission line device.

The structure of the device constituting this invention consists of two semi-conductor diodes which are oppositely poled and which are connected in a conducting manner between the conductors of a two-wire, co-axial, or microstrip transmission line. These diodes are separated from each other by a distance along the transmission line which is determined according to a novel technique which we have devised and which gives the device unique capabilities.

These and other objects, advantages, and features of this invention will become more readily understood from the following description taken in connection with the drawings in which.

Figure 1:
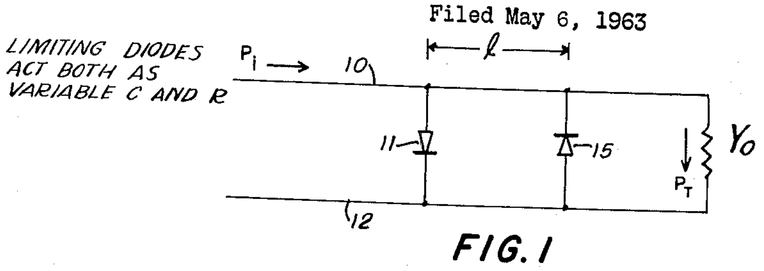
FIG. 1 is a partly pictorial, partly schematic cross-sectional view of a preferred embodiment of the present invention.

The present invention may be used in any type of transmission line structure. FIG. 1 shows one preferred embodiment of this invention placed in a two-wire transmission line. The wires 10 and 12 may be considered to represent the two wires of a transmission line; the inner and outer conductors, respectively, of a rectangular or cylindrical coaxial line; or the strip and ground plane, respectively, of a microstrip transmission line. The diodes 11 and 15 are connected across the two conductors of the line in a passive manner (this means that there is no external bias applied to either of these elements). The diodes are oriented across the transmission line in polarity opposition so that the direction of forward current flow through diode 11 is opposite to the direction of forward current flow through diode 15. The transmission line is terminated by impedance $Z_0$, which represents the load attached to the limiter and which is adjusted to be equal to the characteristic impedance of the transmission line.

The diodes 11 and 15 are separated from each other by a distance $l$ along the transmission line. This dimension $l$ is very important to the operation of the present invention and when its value is properly chosen performance of the device is far superior to that achieved with any other diode separtion. The improved operation achieved when the proper separtion exists between the diodes is far superior to that which would be achieved if this spacing were to be changed by a small amount. When the proper separation distance exists the two diodes influence each other in such a way that effective limiting operation is achieved over an exceptionally wide band of frequencies. Because this frequency range is so large, it should be obvious that the separation between diodes is not directly related to any particular signal wavelength. Further, the use of these diodes with the proper spacing between them permits this device to produce a more uniform limiting over a wide range of input powers. The diodes are oppositely poled in order to produce limiting of both positive and negative signal components at the lower frequencies.

The diodes used are of the semi-conductor type and may be made from germanium, silicon, or gallium arsenide or could be varactors of the pill type, the latter type being preferred.

Figure 2:
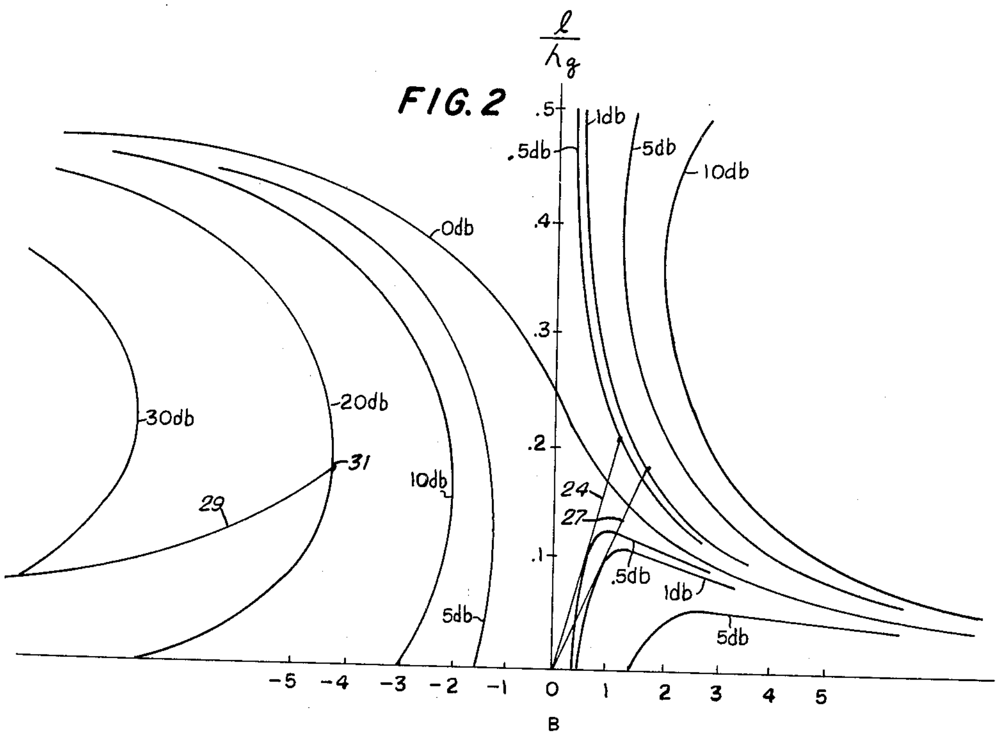
FIG. 2 is a graph used in explaining the behavior of the FIG. 1 device.

The device of FIG. 1 is able to produce a limiting action because of the fact that semiconductor diodes will not conduct below a certain voltage level and will present a finite resistance to voltage exceeding this threshold level. In addition, the point contact diode and the pill-type varactor will exhibit capacitive reactances when in the non-conducting state and inductive reactances when in the conducting state. This characteristic is true for signal frequencies below diode resonance. Although the relation between the nature of the diode reactance and the ability of the FIG. 1 device to produce a limiting action is not apparent, it can be established from a consideration of the attenuation pattern of the device derived with respect to both the spacing between the diodes and the susceptance of one of them. Such a relation is illustrated in the graph of FIG. 2.

In order to derive this graph it is necessary to first obtain an equation for the input impedance at diode 11 in the device of FIG. 1. If low-loss diodes are used these elements can be treated as pure susceptances. Since the transmission line is terminated in its characteristic impedance, the equivalent admittance at diode 15 will be equal to $Y_0+jB$ where $Y_0$ is the characteristic admittance of the transmission line and B is the susceptance of the diode 15. The normalized admittance at diode 15 will then be equal to $1+jB_n$. This admittance is referred back along the line to the diode 11 by means of standard transmission line techniques and the normalized admittance at diode 11 will then be represented by the equation:

$$Y_t=\frac{\cos\frac{2\pi l}{\lambda_g}+j\left(B\cos\frac{2\pi l}{\lambda_g}+\sin\frac{2\pi l}{\lambda_g}\right)}{\left(\cos\frac{2\pi l}{\lambda_g}-B\sin\frac{2\pi l}{\lambda_g}\right)+j\sin\frac{2\pi l}{\lambda_g}}+jB \qquad (1)$$

where $Y_t$ is the normalized total input admittance at diode 11, $l$ is the distance between diodes 11 and 15, $\lambda_g$ represents the wave length of the signal impressed on the transmission line, and B represents the normalized susceptance of one diode with the subscript $n$ being removed for the sake of clarity. All admittances, conductances, and susceptances hereinafter referred to will represent normalized values.

Since the FIG. 1 device is an attenuator, the attenuation in decibels which it produces, denoted by $\alpha$, is given by the equation:

$$\alpha = -10 \log_{10} \frac{P_i}{P_t} \qquad (2)$$

where $P_i$ represents the power inserted at the left end of the transmission line and $P_t$ represents the power transmitted to the load $Y_0$. As is shown in Southworth, Principles and Applications of Waveguide Transmission, D. Van Nostrand Company, 1950, Equations 3.5–12 and 3.5–13, the ratio of incident power to transmitted power is equal to $$\frac{(1+Y)(1+Y^*)}{4re(Y)} \qquad (3)$$

If G' is chosen to represent the equivalent conductance of the input admittance and B' represents the equivalent susceptance, the attenuation produced by the device may be presented by the equation:

$$\alpha = 10 \log\left[\frac{(G'+1)^2+(B')^2}{4G'}\right] \qquad (4)$$

The values of G' and B' can now be derived in terms of the susceptance of one diode and the distance $l$ between the diodes from Equation 1. The terms on the right hand side of Equation 1 are first operated on so that they both appear over a common denominator, the numerator and denominator of the resulting expression are then multiplied by the conjugate of the denominator, and the resulting numerator is separated into real and imaginary components. The result of these operations will produce the following expression for the input admittance:

$$Y = \frac{1}{1-2B\cos\frac{2\pi l}{\lambda_g}\sin\frac{2\pi l}{\lambda_g}+B^2\sin^2\left(\frac{2\pi l}{\lambda_g}\right)} + j\frac{\left(B\sin\frac{2\pi l}{\lambda_g}-\cos\frac{2\pi l}{\lambda_g}\right)\left(B\sin\frac{2\pi l}{\lambda_g}-2\cos\frac{2\pi l}{\lambda_g}\right)}{1-2B\cos\frac{2\pi l}{\lambda_g}\sin\frac{2\pi l}{\lambda_g}+B^2\sin^2\left(\frac{2\pi l}{\lambda_g}\right)} \qquad (5)$$

In Equation 5, the first term on the right hand side represents the term G' of Equation 4 and the second term represents $jB'$. These terms of Equation 5 can be substituted for corresponding terms in Equation 4 to produce an equation containing only the three terms of interest; $\lambda_g$, the signal wavelength on the line; B, the susceptance of one of these diodes; and $l$ the separation between the two diodes. The resulting equation can then be solved for various combinations of values of B and $l/\lambda_g$ in order to obtain a group of values for $\alpha$. The points representing these values of $\alpha$ can be plotted on a curve having an ordinate representing $l/\lambda_g$ and an abscissa representing B, and the plotted points used as references for the construction of constant attenuation curves. The result of this operation is shown in FIG. 2.

Figure 3:
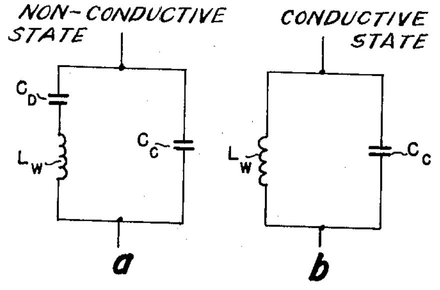
FIGS. 3 are schematics of equivalent circuits of the diodes used in the device of FIG. 1.

The effect on the attenuation produced by the device of FIG. 1 for varying signal frequencies can then be determined directly from the plot of FIG. 2 by means of curves superposed thereon which represents the performance of the device in terms of $l/\lambda_g$ vs. diode susceptance B. Before this relation can be obtained, the nature of the diode susceptance must be determined. To this end, FIG. 3 shows two equivalent circuits for a shunt-connected diode. FIG. 3*a* shows an equivalent circuit for the diode in its nonconducting, or low voltage, state. FIG. 3*b* is an equivalent circuit of the diode in its conducting, or high voltage, state. The capacitance $C_D$ of FIG. 3*a* represents the depletion layer capacitance of the diode and its presence is due to the absence of charge carriers in the region of the point contact when the diode is operating in its non-conducting region. As may be seen from FIG. 3*b*, this capacitance does not exist when the diode is conducting. The diode also has a spreading resistance which is relatively small and which may be ignored for purposes of this discussion.

The device embodying the present invention is intended to operate at frequencies below diode self-resonance. At these frequencies the susceptance of the left-hand branch of the circuit of FIG. 3*a* will be capacitive, so that the entire circuit of FIG. 3*a* will behave as a capacitive susceptance.

Denoting the equivalent capacitance of the circuit of FIG. 3*a* as C, the susceptance B of that circuit may be represented as:

$$B = 2\pi fC \qquad (6)$$

where $f$ represents the frequency of the applied signal. Since it is known that $f$ equals $c/\lambda_g$, the following equation can be derived:

$$f = \frac{cl}{\lambda_g l} \qquad (7)$$

where $c$ represents the speed of light. Substitution of Equation 7 into Equation 6 produces the following relation:

$$B = k\frac{l}{\lambda_g} \qquad (8)$$

where $k$ equals $2\pi Cc/l$. From Equation 8 it may be seen that when the diodes are in their non-conducting state, and when $l$ is constant, the performance of the device of FIG. 1, for varying input signal frequencies, can be represented by a straight line on the graph of FIG. 2. Equation 8 shows that for zero frequency (infinite $\lambda_g$) the operating point will be at the origin of FIG. 2 and that the operating point of the device will move away from the origin along a straight line as the frequency increases. As may be seen from Equation 8, the slope of this line depends upon both the value of the capacitance of the equivalent circuit of FIG. 3*a* and the spacing between the two diodes. The lines 24 and 27 of FIG. 2 are examples of such straight line characteristics. The upper end of these lines represents the low power operating point of the device for the highest frequency of interest. Since the slope of this line is equal to $1/k$, and since, for a given value of capacitance C, the value of $1/k$ is directly proportional to $l$, the slope of the line representing this low power characteristic can be varied by varying the separation $l$ between the two diodes. Thus, after selecting the highest frequencies at which the device is to operate the value of B for that frequency can be determined from Equation 6, a vertical line could then be constructed on the graph of FIG. 2 at that value of B, and a straight line from the origin could be drawn to some point along that vertical line at such an angle that the low power attenuation of the device is always less than some value. For example, if it is found that at the maximum frequency of interest the value of susceptance of a diode is equal to 1.2 and the maximum desired insertion loss for low power operation is .5 db, then the line 24 could be constructed on the right half of the graph so that it terminates on a vertical line drawn from the 1.2 B abscicissa point and is also tangent to the lower .5 db curve. As may be seen from the line 27, if a higher attenuation is tolerable a higher value of susceptance may be reached, giving the device a higher upper frequency limit. Once the value for $\lambda_g$ is determined for the upper frequency limit of operation, the ordinate of the uppermost point of the low powered characteristics may then be measured to determine the required separation $l$ between diodes.

The high power characteristic of a single diode may be determined by a similar procedure. FIG. 3*b* shows the equivalent circuit for the diode operating in its high power, or conducting, region. In this region the depletion layer capacitance $C_{dD}$ is eliminated so that the susceptance of the equivalent circuit is due to parallel combination of $L_w$, which represents the inductance contributed by the diode "whisker," and $C_c$, the capacitance present between the end pieces of the diode mount. Since the device of FIG. 1 operates below the resonant frequency of the diode, the effective susceptance of this parallel combination will be inductive in nature. This effective inductance is represented by L.

The susceptance of the diode in the high power state may be represented by the equation:

$$B=-\frac{1}{2\pi fL} \quad (9)$$

Substitution of Equation 7 into Equation 9 yields:

$$B=\frac{-1}{k'\frac{l}{\lambda_g}} \quad (10)$$

where $k'$ equals $2\pi Lc/l$. It is clear from the form of this equation and from the negative value of inductive susceptance that the high power characteristic for the device will be represented by a hyperbolic curve in the left-hand portion of FIG. 2. Curve 29 represents a typical curve constructed in accordance with Equation 10.

The point 31 on curve 29 represents the operating point of the device at the uppermost frequency of operation and corresponds to the uppermost point on the low power characteristic curve 27. Equation 9 shows that the value of the inductive susceptance for a given frequency is dependent only on the value of the equivalent inductance L. Since this value depends only on the particular diodes used, the value of the absicissa of a particular point on the high power characteristic curve 29, such as the point 31, will not change if the frequency is not varied. However, the ordinate of this point may be changed by varying the spacing between the diodes. Therefore, the point 31, which represents the point of lowest attenuation in the high power region can be moved vertically on the graph of FIG. 2 by varying the diode spacing until it is at a point where the attenuation is maximum. In FIG. 2 the point 31 is shown to be at such a location, as may be seen from the fact that movement of the point either up or down will cause it to shift into a region of lower attenuation.

Thus it may be seen that, once the upper frequency of the device is determined and the resulting values of low power and high power susceptance are determined, the highest frequency point of the high power and low power curves can be shifted simultaneously in a vertical direction until the point of optimum operation is reached. This point then indicates the spacing which the diodes must have between them in order that the device of FIG. 1 attain optimum operation.

It should be noted that the same procedure may be followed in the determination of the proper spacing between two diodes placed in series in a transmission line. In this case the diode reactances would be considered rather than their susceptances.

It will be apparent that the embodiments shown are only exemplary and that various modifications can be made in construction and arrangement within the scope of the invention as defined in the appended claims.

We claim as our invention:

1. A broad band TEM diode power limiter comprising:
(a) a transmission line having two conducting members;
(b) a load terminating said transmission line and having an impedance equal to the characteristic impedance of said transmission line; and
(c) a pair of diodes electrically connected in a passive manner between said two conducting members in such a manner that the polarity of one of said diodes is opposite the polarity of the other of said diodes, the distance between said diodes along said transmission line being that distance necessary to cause said power limiter to produce its optimum high power attenuation of the highest frequency signal which it is desired to limit.

2. A broad band TEM diode power limiter as recited in claim 1 wherein said transmission line is a two wire parallel transmission line.

3. A broad band TEM diode power limiter as recited in claim 1 wherein said transmission line is a coaxial line having an inner and an outer conductor.

4. A broad band TEM diode power limiter as recited in claim 1 wherein said transmission line is a microstrip transmission line having a strip conductor and a ground plane.

5. A broad band TEM diode power limiter as recited in claim 1 wherein said diodes are varactor diodes.

6. The method of determining the optimum separation of the diodes in a broad band TEM diode power limiter comprising a transmission line having two conducting members, a pair of diodes electrically connected in a passive manner between said two conducting members, and a load element terminating said line and having an impedance equal to the characteristic impedance of said line, from a preconstructed graphical attenuation pattern of the broad band TEM diode power limiter derived with respect to the spacing between diodes as a function of frequency plotted as the ordinate and a function of the susceptance of one of the diodes plotted as the abscissa, said method comprising the steps of:
(a) selecting the highest frequency at which the limiter is to operate;
(b) determining the low power susceptance for a diode at that frequency;
(c) constructing a vertical line from the abscissa of said preconstructed graphical attenuation pattern at the point corresponding to the low power susceptance of the diode;
(d) constructing a straight line from the origin of said preconstructed graphical attenuation pattern to intersect the vertical line, said straight line being constructed at such an angle that low power attenuation at any point along said straight line between the origin of said pattern and the point of intersection of said straight line with said vertical line is always less than some desired value; and
(e) measuring the ordinate of the point of intersection of said straight line with said vertical line to determine the spacing between the diodes.

7. The method of determining the optimum separation of the diodes in a broad band TEM diode power limiter as recited in claim 6 further comprising the steps of:
(a) constructing a hyperbolic curve corresponding to the high power susceptance of a diode as a function of frequency at the spacing between diodes as determined by measuring the ordinate of the point of intersection of said straight line with said vertical line;
(b) locating the operating point of the limiter on said hyperbolic curve at the highest frequency at which the limiter is to operate by plotting a horizontal line through the point of intersection of said straight line with said vertical line intersecting with said hyperbolic curve;
(c) shifting the highest frequency point of operation along said hyperbolic curve and said straight line in a vertical direction until the point of optimum operation of said limiter is reached; and
(d) measuring the ordinate of the resulting point of optimum operation to determine the optimum separation of the diodes.

References Cited by the Examiner

UNITED STATES PATENTS

| | | | |
|---|---|---|---|
| 2,630,491 | 3/1953 | Waltz | 178—44 |
| 2,835,867 | 5/1958 | Golden | 323—66 |
| 3,107,335 | 10/1963 | Hunton et al. | 333—81 |
| 3,109,152 | 10/1963 | Dachert | 333—31 |

LLOYD McCOLLUM, *Primary Examiner.*

A. D. PELLINEN, *Assistant Examiner.*